April 15, 1941.　　　A. B. HURLEY　　　2,238,365
LIGHT-REFLECTING AND SOUND-TRANSMITTING SCREEN
Filed Nov. 20, 1937
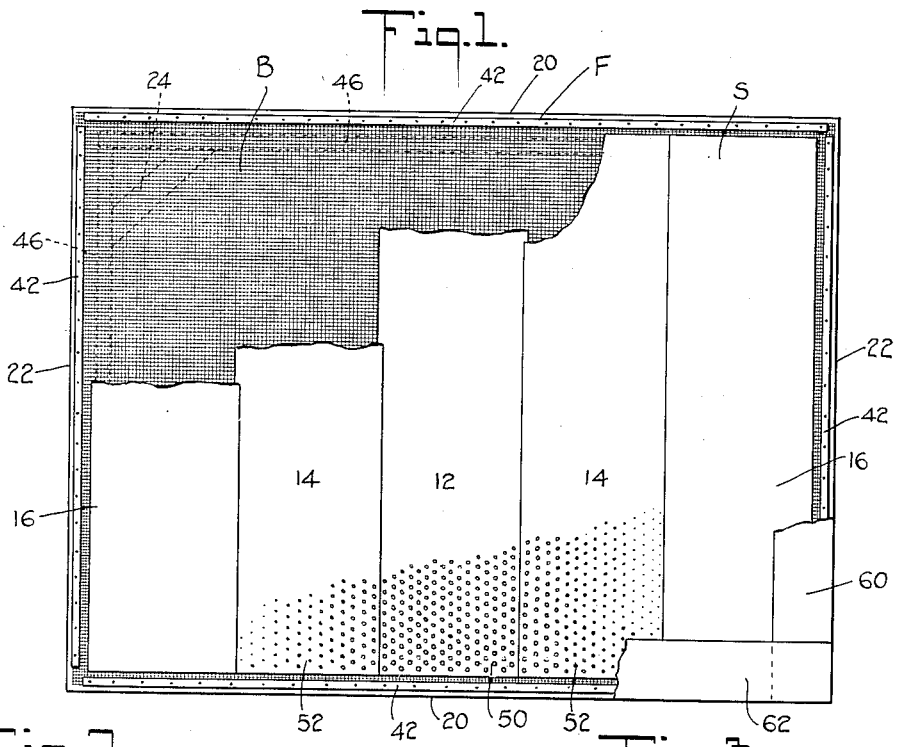
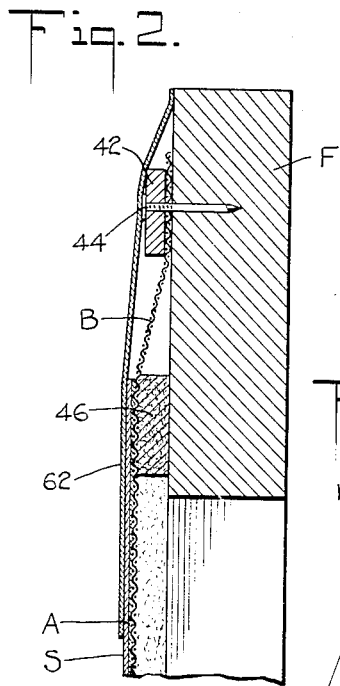
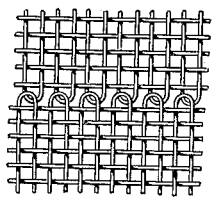
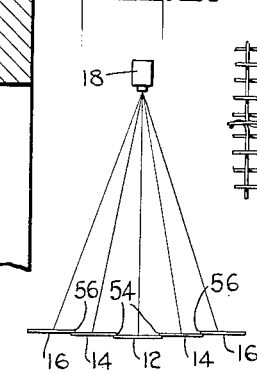
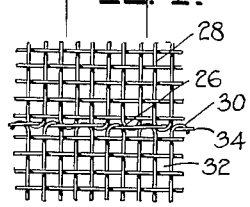
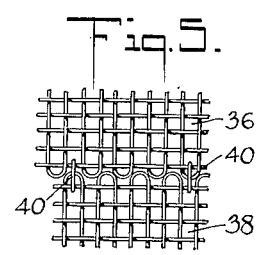
INVENTOR
Albert B. Hurley
BY
ATTORNEYS Patented Apr. 15, 1941

2,238,365

UNITED STATES PATENT OFFICE 2,238,365

LIGHT-REFLECTING AND SOUND-TRANSMITTING SCREEN

Albert B. Hurley, Huntington, N. Y.

Application November 20, 1937, Serial No. 175,663

6 Claims. (Cl. 88—24)

This invention relates to light-reflecting screens for motion pictures, and, more particularly, to sound-transmitting screens for use in reproducing sound motion pictures.

At the present time, to fabricate a motion picture screen a heavy expensive fabric material is coated and then perforated by a perforating machine necessarily having limitations in width, so that the screens produced consist of several panels sewed together and then bound and grommeted for lacing and stretching in a special frame provided for this purpose.

Some seamless screens are used, but they are very limited in size. The method of coating is by stretching the seamless fabric on a frame at the factory and using a spray or brush to apply reflecting pigment. Perforating a seamless screen is more or less a hand operation and is considerably more expensive than machine perforation. The seamless screen is bound and grommeted and stretched in a frame in the same manner as the fabricated panel type screen.

As the binding, grommets, lacing line, hooks, and frame are exposed it is necessary to mask them with a light-absorbing material such as black velour or duvetyne. This black material also outlines or frames the picture, the light being allowed to spill over on the black to avoid a rough outline or a magnification of any dust or particles that may adhere to the edges of the aperture in the projector. This black masking material is usually fastened to a separate light wooden framework, which may in turn be secured to the main frame.

The reflecting surface deteriorates with age, and should be replaced frequently, but because of the high cost of installing a new screen, the exhibitor does not purchase one as often as needed. Some exhibitors have attempted to have the screen resurfaced by spraying or brushing on a new surface coating. This resurfacing has not proved satisfactory for several reasons, one very important one being that such resurfacing, while increasing the reflection factor, decreases the sound transmission by filling the perforations and adding density to the screen material. The manufacturers of sound systems demand a certain necessary minimum of perforations for good sound transmission. For example, this minimum is 9% of the area in a coated fabric .0016 thick and weighing 1⅜ ounces per square foot. The screen manufacturer cannot increase this perforated area to allow for resurfacing without greatly decreasing the illumination of the picture obtained, for even the minimum area represents a serious loss of reflection.

Because of the foregoing difficulties, it has been the practice to buy complete new screens for motion picture theatres at intervals, the effective life of the screen being a matter of only one or two years, at most.

The primary object of the present invention is to generally improve motion picture screens, particularly by providing the same with a readily renewable light-reflecting surface. In accordance with some of the features and objects of my invention, the screen comprises a relatively durable, widely open or reticulated base made, for example, of wire mesh permanently secured in place, and a thin, relatively inexpensive light-reflecting surface made, for example, of paper, temporarily secured to the base, as by means of a plastic or permanently soft adhesive. When the light-reflecting surface of the screen is to be renewed, the old material is simply stripped from the base, and a new light-reflecting surface is applied to the base, much as though putting up wall paper or billboard advertisements, but by means of an adhesive somewhat like that on Scotch tape or surgical tape.

Further objects of my invention are to simplify the handling and application of the light-reflecting material by manufacturing and using the same in strips or panels; to so assemble the panels as to make the seams inconspicuous and invisible to the audience; to provide the desired amount of perforation in the light-reflecting material for sound transmission; to so relate the panels and the perforations formed therein as to provide gradational perforation of the screen to compensate for inequality of screen illumination; to employ an adhesive between the light-reflecting material and the screen which will permit ready stripping of the light-reflecting material, and which will avoid loading the base with an accumulation of adhesive; and to provide masking directly on the screen should that prove desirable in any particular installation.

To the accomplishment of the foregoing, and such other objects as will hereinafter appear, my invention consists in the motion picture screen elements and their relation one to the other, as hereinafter are more particularly described in the specification and sought to be defined in the claims. The specification is accompanied by a drawing, in which:

Fig. 1 is a front elevation of a screen embodying features of my invention;

Fig. 2 is an enlarged section through one edge of the screen;

Fig. 3 is a detail showing one method of fastening the adjacent edges of the wire mesh base where several sections are used to make up the necessary screen area;

Fig. 4 shows a modified method of securing together the edges of the wire mesh base;

Fig. 5 shows a modified method of securing together the edges of the wire mesh base; and Fig. 6 is explanatory of how the preferred assembly of the panels of light-reflecting material avoids shadows at the seams.

Referring to the drawing, and more particularly to Figs. 1 and 2, the screen comprises a suitable frame F carrying a durable base B preferably made of wire mesh or similar reticulated material. A light-reflecting surface S preferably made of comparatively inexpensive material is applied to the front of the base B by means of an adhesive A (Fig. 2) which may be released by means of a suitable solvent, or more preferably, which is a plastic or permanently tacky adhesive coated on the back of the light-reflecting material S. The base B is permanently secured to the frame F while the light-reflecting surface S is only temporarily secured to the base B. When the surface S is dirtied, discolored, or loses its light-reflecting quality, it is simply stripped from the base B and a new light-reflecting surface is applied.

The invention is applicable to silent motion pictures, and in such case the light-reflecting surface S may be imperforate. However, in the more common case of sound motion pictures, the surface S is preferably perforated for sound transmission. To simplify the drawing, only a few of the perforations have been indicated in Fig. 1, and it will be noted that the perforations are preferably, though not necessarily, of the gradational type disclosed in my co-pending application Serial Number 137,421, filed April 17, 1937, there being a maximum area of perforation at the center of the screen as indicated at 12, gradational perforations at the intermediate parts of the screen, as indicated at 14, while the sides of the screen may be imperforate, as indicated at 16. This helps produce uniform illumination over the entire surface of the screen, for, as will be evident from inspection of Fig. 6, the light rays from the projector 18 strike the screen perpendicularly at the center portion 12, and angularly at the intermediate portions 14, and with still more angularity at the side portions 16, so that the illumination of the screen is most intense at the center and least intense at the sides. This gradational perforation provides the maximum area of perforations at the middle of the screen where the loud speakers are customarily located.

Considering the specific structure here illustrated in greater detail, the frame F may be constructed simply or elaborately depending on its size and whether it is to be left permanently in place or raised for stage purposes. In the present case, it comprises horizontal wood members 20, vertical members 22, and diagonal corner braces 24, only one of which is visible in Fig. 1.

The reticulated base B is made of wire mesh or screening, preferably of conventional type already commercially available on the market. If the screen is small, a single piece or section of wire mesh may be used. The wire mesh is obtainable inexpensively in widths up to 10 feet, but at greater expense, in widths up to 24 feet. It is therefore possible to accommodate even a relatively large screen with a single piece of wire mesh. However, I prefer to use widths of 10 feet or less, the edges being secured together in any suitable manner. They may be sewed or laced together by a strand of wire, as illustrated in Fig. 4, in which it will be seen that the end loops 26 of section 28 and the end loops 30 of section 32 are laced together by wire strand 34. If desired, the end loops 26 and 30 may be partially overlapped and secured together by soldering, or by spot-welding, as illustrated in Fig. 3, or they may be interleaved as shown in Fig. 4, and secured together by soldering instead of by lacing. In Fig. 5 the edges of sections 36 and 38 are secured together by a series of short wire staples 40 which are clenched in place.

The resulting wire mesh base is stretched taut on frame F and is secured in place by any suitable means. In the present case, wood strips 42 are placed over the edges of the screen and are secured in place by nails 44.

Sound-deadening material is preferably interposed between the wire base and the frame. In the present case, strips of felt 46 extend entirely around the periphery of the screen and the wire mesh is nailed directly against the frame but outside the felt strips, thus serving to hold the wire mesh taut, as well as to eliminate undesired sound.

For convenience in handling, the replaceable reflector material is preferably made in the form of strips or webs. Both the wire mesh and the reflector material may be delivered to the theatre in roll form and there assembled. The sections of wire mesh are, however, preferably secured together by the screen manufacturer before shipping the same to the theatre, although they may be assembled in the theatre, in which case it is unnecessary for the screen manufacturer to use a manufacturing plant except for the preliminary treatment of the light-reflecting material.

The seams in the wire mesh may extend either vertically or horizontally, but the seams in the light-reflecting material are preferably made vertical, vertical seams being least conspicuous because of the vertical lines anyway produced by film movement, and vertical seams being additionally inconspicuous when arranged as here described to avoid shadows at the seams.

When overlapping seams are used, the center strip or panel 50 of the light-reflecting material is applied first, the intermediate panels 52 are applied next, and so on, until the side edges of the screen are reached. The reason for this sequence may be explained with reference to Fig. 6, in which it will be seen that the exposed edges 54 and 56 of the panels are illuminated rather than shadowed, thus helping avoid detection of the seams. If the panels were applied in opposite sequence, each edge would cast a shadow tending to make the seam conspicuous.

It will thus be seen that the panels of the light-reflecting material are made vertical for a number of reasons, and that this vertical disposition of the panels is particularly convenient when dealing with gradational perforation as illustrated in the drawing, and as has been more particularly described in my copending application previously referred to.

The screen is customarily masked by means of a separate mask disposed in front of the screen and supported on a frame of its own. In some installations it may, however, be convenient to apply the mask directly to the light-reflecting screen itself. With the present construction, this may be done by the provision of dull black, non-reflective material made of paper, fabric, or the like, and preferably provided on its back with a plastic adhesive such as is used on the light-reflecting material. Strips of this masking material are applied directly over the light-reflecting material as is indicated in Fig. 1 by the vertical strip 60 and horizontal strip 62. This type of mask is, of course, extended entirely about the periphery of the screen, and only a short section of the masking is shown in Fig. 1, in order not to complicate the drawing.

In general, the backing material need not be wire mesh, but should have a very large perforation area, compared to its solid area. It may be of metal, fabric, or composition board, etc. I prefer, however, to use a metal screen having 12 to 16 mesh per inch. This type of backing gives the maximum of open area in relation to a sufficient solid surface to which the light-reflecting material can be secured and then easily removed. It is advantageous that the backing be in one piece in order to present an unbroken surface to the light-reflecting material, which, however, may be in a number of pieces or panels. However, for the sake of economy, it may be desirable to use metal screen in standard widths, even though narrower than the screen, in which case the edges may be joined as heretofore described.

The metal backing may, if desired, be insulated from the frame by felt or any other sound deadener as a precaution against resonance. In use with very powerful sound systems, or in the event that there is relative vibration in the wires, a coating of paint or varnish helps the situation. In such cases, a metal screen with welded joints, or one with finer or more tightly woven wires, may be used to minimize relative vibration, lest it cause breaking down of the adhesive. This welded metal cloth or screen is a known commercial article, sometimes called hardware cloth. The wires used are heavier and the openings greater than is the case with window or insect screening.

The light-reflecting material may be made of paper, or fabric, or paper backed with a light mesh fabric base, or any other suitable composition material, and it may be coated with known reflecting materials such as white pigment, aluminum, glass beads, etc. In all ordinary cases it is essential that the material be very porous, or else perforated for sound transmission. I prefer to use paper or cloth, or a combination of the two, because they have a good natural light-reflecting surface or can be readily coated with other light-reflecting substances. High tensile strength is not needed, and the material may be economical in cost. With cloth, the weave may be porous enough to dispense with perforations. The cloth can be a very inexpensive one. With paper it is desirable to actually perforate the same.

The reflective surface may be perforated in any approved manner. Uniform perforation may be used, in which case all the strips or panels are alike, and may be unrolled from a single large roll of material. More preferably, the panels are perforated as described in my pending application for Letters Patent Ser. No. 137,421, previously referred to, in which case three types of roll are used, one with uniform perforations, one with gradational perforations, and one imperforate. If the paper is coated with white or aluminum, the perforating can be performed as a finishing operation. If glass beads are used, the perforating must be done before they are applied. One advantage of my invention is that the percentage area of perforation may be reduced, say from 9% to 5%, due to the use of thin paper-like material in contrast with the heavier fabric needed in ordinary screens.

The reflective panels are attached to the backing by any suitable commercial adhesive, preferably a plastic or permanently tacky one for ease in removal and replacement. This operation can be performed by applying the adhesive to the back of the reflecting material, or to the face of the backing, or both, after which the reflecting material can be smoothed on like wall paper. If the reflecting material is perforated, the preferred procedure is to apply the adhesive to the material at the factory, and to apply the same only to the back of the reflective material. By following this procedure the perforations are kept free of adhesive that might otherwise clog them with resultant effect on the sound transmission. A soluble rather than tacky adhesive may be used, because of the ease with which the solvent may be sprayed or brushed onto the back of the wire mesh, thus readily releasing the reflecting material on the front of the wire mesh. The adhesive may be broadly referred to as "releasable."

The adhesive may be that made by Minnesota Mining Company and used by them on so-called Scotch tape, this tape being temporarily applied to surfaces to assist the painting of stripes or the like. It may also be an adhesive much like that used on surgical tape. In referring to the adhesive as being permanently tacky, I mean tacky in the sense of softness rather than wetness or stickiness. In other words, the adhesive may become fairly dry yet be usable provided, however, that it does not become physically hard. Furthermore, it must be fairly thick or full-bodied first, so that it will tend to come around the wires, and second, so that there will be some yieldability between the wire and the paper.

The paper itself is preferably given special treatment to avoid the effects of changes in humidity. I have found that the paper may expand or contract greatly with changes of humidity relative to the humidity existing at the time of first application of the paper to the screen. If the material is put on the wire mesh at a time of low humidity, it may expand into noticeable wrinkles at a time of high humidity, for the paper is hygroscopic and absorbs moisture. If the paper is put on at a time of high humidity, it may dry and contract at a time of low humidity with consequent injury or parting at the seams. The perforation of the paper accelerates this effect because moisture may be absorbed through the edges of the holes as well as through the surface.

Because of this situation, several corrective treatments may be resorted to, one being water-proofing treatment of the paper, and another being preliminary intentional creping or pebbling of the paper. I prefer to use both treatments.

It is difficult to water-proof the paper after perforating the same, largely because the water-proofing material should be applied before the adhesive is put on the paper and the latter should preferably be applied before the paper is perforated. In the present state of the art, I, therefore, recommend water-proofing the paper before perforation even though this leaves the edges of the perforations open for the absorption of moisture.

The paper is treated to emboss it in such a manner as to break up the body of the material, as by the formation of bridges and valleys, or creping, or by the formation of dots or pebbling. With this treatment, the paper readily accommodates any expansion or contraction caused by changes in humidity without tending to form noticeably large wrinkles or separations from the screen. In referring to creping, it will be understood that the paper is not like ordinary thin crepe paper used for decorations at parties, because the paper is substantially thicker and the creping thereof is substantially less, there being no deep valleys such as would produce objectionable shadows on the screen. As a matter of fact, it is desirable to treat the paper in the manner here disclosed wholly aside from the question of physical stretch or contraction, for the finish which I obtain prevents glare and instead produces a desirable degree of diffusion.

Where actual perforations are made through the screen material, it is desirable to make the spacing between the holes different from the spacing on the screen wires by an odd or irrational relation so that there is no possibility of the wires coming into registration with the holes and thus blocking the holes. With an odd relation of center-to-center distance, a screen wire may come across a hole at one point but this effect can be repeated only at very widely spaced points on the screen.

As it requires several panels to complete a full size screen, it is necessary to join them, and this can be done by an over and under lapping seam, as already described, or by butting the edges. Through experience, I have found that a white diffuse surface can be overlapped, but that it is preferable to make a butt edge seam when using aluminum or glass beads or any highly specular reflecting coating.

The panels may run vertically, horizontally, or even at an angle to the frame. However, a vertical seam is least noticeable in the projected picture. With lapped seams, I prefer to apply the center panel first and the outer panels in successive order, as already described.

It is believed that the construction and manner of use, as well as the many advantages of my improved screen with renewable surface, will be apparent from the foregoing detailed description thereof. It will also be apparent that while I have shown and described the invention in preferred forms, many changes and modifications may be made in the structure disclosed, without departing from the spirit of the invention defined in the following claims.

I claim:

1. A light-reflecting, sound-transmitting motion picture screen comprising a frame, a very highly perforate base made of durable material permanently secured to said frame, and a paper light-reflecting surface secured on the front face of said base by means of a readily releasable adhesive, said paper surface being perforated for sound transmission and being adapted to be removed from the base and replaced when dirtied.

2. A light-reflecting, sound-transmitting motion picture screen comprising a frame, a wire mesh base permanently secured to said frame, and a light-reflecting surface material temporarily secured on the front face of said base by means of a permanently tacky adhesive, said light-reflecting surface material being made of paper, and being perforated for sound transmission, said surface material being adapted to be removed from the wire mesh base and replaced when dirtied.

3. A light-reflecting motion picture screen comprising a frame, a very highly perforated base made of durable material permanently secured to said frame, and a light-reflecting surface material temporarily secured on the front face of said base or screen, said light-reflecting material being applied in the form of panels disposed vertically with the inner edges of the side panels overlapping the outer edges of the center panels, said panels being adapted to be removed from the base and replaced when dirtied.

4. A light-reflecting, sound-transmitting motion picture screen comprising a frame, a wire mesh base permanently secured to said frame, and a light-reflecting surface temporarily secured on the front face of said base by means of a releasable adhesive, said light-reflecting material being applied in the form of panels disposed vertically with the inner edges of the side panels overlapping the outer edges of the center panels, the center panel having a maximum area of perforation for sound transmission, the intermediate panels being gradationally perforated to reduce the perforation area toward the sides of the screen, and the side-most panels being imperforate.

5. A light-reflecting, sound-transmitting motion picture screen comprising a frame, a wire mesh base relatively permanently secured to said frame, and a light-reflecting surface temporarily secured on the front face of said base, said light-reflecting surface being made of paper, said paper having a rough surface the roughness of which is independent of the pitch of the wire mesh base, said rough surface being such as to aid diffusion and to accommodate expansion or contraction with changes of humidity.

6. A light-reflecting, sound-transmitting motion picture screen comprising a frame, a reticulated base relatively permanently secured to said frame, and a light-reflecting surface temporarily secured on the front face of said base by means of a readily releasable adhesive, said light-reflecting surface being made of paper, said paper being treated by a suitable water-proofing process to minimize expansion or contraction with changes in humidity, said paper being adapted to be removed from the reticulated base and replaced when dirtied.

ALBERT B. HURLEY.